(12) United States Patent
Kalms et al.

(10) Patent No.: US 8,582,330 B2
(45) Date of Patent: Nov. 12, 2013

(54) HIGH VOLTAGE AND FREQUENCY DISTRIBUTED POWER SYSTEM

(75) Inventors: William Kalms, Baltimore, MD (US); John Morber, Taneytown, MD (US); Robert Asbell, Bel Air, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 746 days.

(21) Appl. No.: 12/358,382

(22) Filed: Jan. 23, 2009

(65) Prior Publication Data

US 2010/0188875 A1 Jul. 29, 2010

(51) Int. Cl.
*H02J 3/00* (2006.01)

(52) U.S. Cl.
USPC .............................. 363/34; 363/39

(58) Field of Classification Search
USPC .......... 363/21.12, 21.13, 21.14, 21.15, 21.16, 363/34, 39, 40, 41
See application file for complete search history.

(56) References Cited

U.S. PATENT DOCUMENTS

| | | | | |
|---|---|---|---|---|
| 5,805,793 | A * | 9/1998 | Green | 714/32 |
| 5,894,412 | A * | 4/1999 | Faulk | 363/17 |
| 6,055,165 | A * | 4/2000 | Drobnik | 363/44 |
| 6,418,037 | B1 * | 7/2002 | Zhang | 363/15 |
| 6,694,438 | B1 * | 2/2004 | Porter et al. | 713/300 |
| 6,937,117 | B2 * | 8/2005 | Terashima et al. | 333/205 |
| 7,443,054 | B2 * | 10/2008 | Pozzuoli et al. | 307/77 |
| 7,615,981 | B2 * | 11/2009 | Wong et al. | 323/285 |
| 7,720,457 | B2 * | 5/2010 | Lucinian | 455/296 |
| 7,834,612 | B2 * | 11/2010 | Sohnis et al. | 323/318 |
| 2007/0236975 | A1 * | 10/2007 | Lippojoki et al. | 363/66 |
| 2008/0315684 | A1 * | 12/2008 | Cheng et al. | 307/45 |
| 2008/0316773 | A1 * | 12/2008 | Neubarth et al. | 363/17 |
| 2009/0168462 | A1 * | 7/2009 | Schopfer et al. | 363/21.01 |
| 2009/0201098 | A1 * | 8/2009 | Hannah | 333/20 |
| 2009/0296432 | A1 * | 12/2009 | Chapuis | 363/65 |

\* cited by examiner

*Primary Examiner* — Adolf Berhane
*Assistant Examiner* — Lakaisha Jackson
(74) *Attorney, Agent, or Firm* — Whitham, Curtis, Christofferson & Cook, P.C.

(57) ABSTRACT

A switching power supply transmits power between a single front end including electromagnetic interference filtering and power factor correction circuits to an output end at a high voltage and high frequency from which any desired DC voltage or waveform may be readily and directly derived with high efficiency in order to reduce size and weight of components including transformers at the output end and allow greater variety of connection wiring of reduced weight and volume to be used. The high frequency is limited at the low frequency end by the frequency at which significant power can be transferred through, for example, a ferrite core or other transformer of sufficiently low volume to accommodate closely spaced loads or power converters and at the high frequency end by the wavelength in the connection wiring such that 1/10 wavelength is greater than one thousand feet. Branches of the power distribution system which are not desired to be in use can be operated at zero power and be brought back on line within milliseconds, when needed. Power distribution among respective branches of the power distribution system can be controlled by varying the high frequency of power transmission and appropriate filtering.

23 Claims, 5 Drawing Sheets

HIGH VOLTAGE AND FREQUENCY DISTRIBUTED POWER SYSTEM

BACKGROUND OF THE INVENTION

1. Field of the Invention

The present invention generally relates to power distribution systems and, more particularly to power distribution systems for distribution of power less than approximately 1000 feet from the power source connection and having reduced hardware requirements while exhibiting enhanced power conservation.

2. Description of the Prior Art

The use of electrical power has become substantially ubiquitous in most aspects of modern life. Accordingly, power distribution systems at many levels such as regions of a national or continental power grid, large industrial plants, building complexes, individual buildings such as offices, hospitals, apartments, homes and the like or even vehicles such as ships or aircraft are familiar and, until fairly recently, designs have been well-optimized to provide power in virtually all applications where power is needed. Such power distribution systems generally operate at standardized voltages of 110 or 220 volts except where distances that are involved require higher voltages, often at thousands of volts, so that currents and wire sizes required to carry them can be reduced and/or to reduce the resistive losses and consequent voltage drops over long wire lengths. In such systems, use of alternating current allows alteration of voltages to desired levels by the use of transformers and low frequencies (e.g. 50-60 Hz or sometimes 400 Hz where smaller and/or lower weight transformers are mandated) are favored for simplicity and reliability.

However, much of the efficiency and effectiveness of such systems is based on designs which assume that power demands will fluctuate only slowly at levels approximating an average demand or load with only limited capacity to handle peak loads. Arrangements to provide supplemental power for peak loads generally require some sort of stand-by switching arrangement for diversion of power from other loads or where excess power generation capacity is available. Such stand-by arrangements are often complex and cannot be brought on-line quickly while consuming some amount of power which may be significant. Such arrangements are also particularly problematic in power distribution systems for vehicles such as aircraft or ships or some special purpose land-based vehicles such as mobile health care or medical screening vehicles or in installations such as health care facilities having sporadically used high-load equipment where the ability to satisfy a peak load may be of high importance if not critical and sources of additional power are likely to be limited (e.g. separately powered generators which cannot be started quickly or which consume considerable fuel in a stand-by state). Further, in vehicles where external potential sources of excess power generation capacity are not available, there may be the additional criticality of space or weight limitations that, as a practical matter, may preclude power distribution in a conventional manner to answer peak power demands.

For example, a ship or aircraft of current design will often have a plurality of computers included in the design and may include equipment that may include additional computers and other apparatus which potentially have large power requirements or where full operational loads may be many times that of the average or stand-by operational modes (which may, in turn, be many times the load in a so-called "sleep" mode that can be returned to a stand-by or full operational mode very quickly). Such computers will generally require power at a plurality of different voltages (which may be generated internally from a single voltage input although each conversion carries its own level of inefficiency as well as increasing the size and weight of each of such computers and equipment). Where space and weight are critical and power is required at different voltages, it has been proposed to provide power distribution at such a plurality of voltages or at least a plurality of voltages from which the required voltages may be developed. However, the disparity between peak power requirements and stand-by or sleep state power requirements of computers are becoming greater and the gain in space and weight savings is becoming increasingly limited, especially at the load location, due to the need to supply transient power requirements from power conversion devices within limited weight and volume specifications, particularly if the power is supplied from low frequency alternating current due, in part, to stringent regulation requirements.

The gains possible from such an approach are further reduced as the number of voltages required to be distributed is increased. That is, while the number of voltages required by any particular computer or individual piece of equipment may be less than ten, the number of different voltages required over all of the computers and equipment and their foreseeable replacements and upgrades may be significantly larger. Moreover, the power distribution system, as originally constructed, would generally provide all of the needed voltages that can be anticipated over the useful lifetime of the power distribution system whereas the computers and other equipment may be replaced or upgraded many times during such a period and such replacement computers or equipment may require different voltages than the computers or equipment they replace. For instance, the useful lifetime of an aircraft or ship may be (or may be extended to be) in excess of fifty years while the period of obsolescence of computers included therein may be three to ten years.

Moreover, it is becoming increasingly common to build ships and aircraft which can satisfy many different purposes and functions through interchange of equipment which may have distinctly different voltage requirements. Thus, if power distribution must be provided at low voltage and high current, the space available for the necessary power cables alone can easily be exceeded by large cables carrying even a relatively small number (e.g. 10-12) of different voltages. Similarly, deriving different low voltages locally to numbers of loads commonly encountered in vehicles or facilities at the present time can easily require a greater weight and/or volume of transformers than can be provided.

Accordingly, conventional power distribution system designs are being found to be inadequate, substantially less than optimal or simply not feasible increasingly often. For example, while a power distribution system of maximum tolerable size and weight for a given application might well accommodate loads well above average loads, the maximum power that can be delivered may be only a relatively small fraction of the potential peak load possible if potential loads are to be concurrently supplied with adequate power while diversion of power from other systems is much less likely to be possible in a vehicle. Moreover, additional power generation and distribution apparatus of conventional design that might be tolerable to accommodate peak load carry the additional cost of consuming stand-by power or may be brought on line only slowly, which may be deemed inadequate and an unacceptable operational constraint, particularly in vehicles. Thus, it is seen that conventional power distribution architectures are inadequate for many modern applications.

SUMMARY OF THE INVENTION

It is therefore an object of the present invention to provide a power distribution system of increased efficiency and controllability with much reduced hardware requirements.

In order to accomplish these and other objects of the invention, a power distribution system architecture is provided including a front end receiving power at an input voltage and generating a voltage above the input voltage at a high frequency above that which allows efficient transfer of power by a transformer having a volume and core weight only a few percent of that of a transformer capable of transferring the same amount of power at 60 Hz and below that which will reduce one-tenth of the propagation wavelength in connection wiring below one thousand feet, and an output end including a power converter for producing a desired voltage or waveform from the voltage above the input voltage and spatially separated from the front end and connected to the front end by connection wiring.

In accordance with another aspect of the invention, a method of controlling power distribution among branches of a power distribution network is provided in which power is transferred at a high frequency above a frequency at which power can be transferred by a transformer having a volume and core weight of only a few percent of that of a transformer capable of transferring the same amount of power at 60 Hz including steps of varying the high frequency, and filtering the frequency in connection wiring of said power distribution network.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
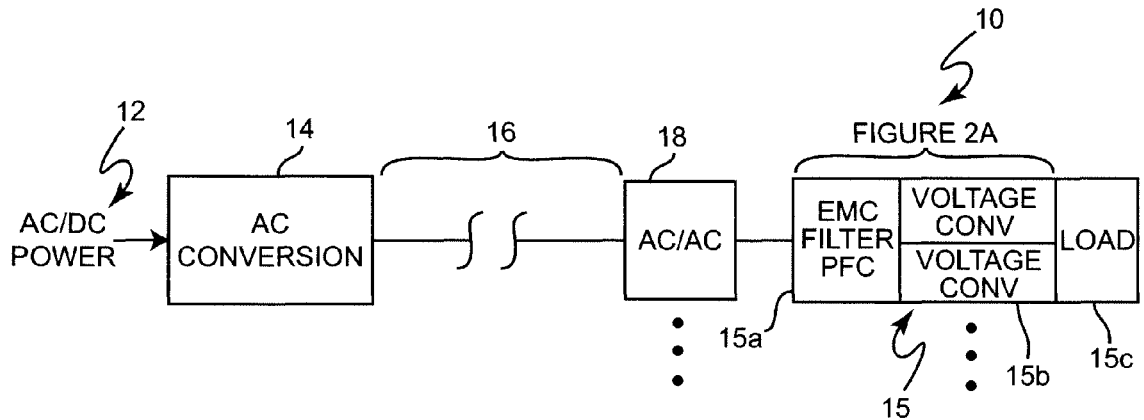
FIG. 1A is a high-level block diagram of a conventional power distribution system.

Referring now to the drawings, and more particularly to FIG. 1A, there is shown a high-level block diagram of a conventional power distribution system widely implemented at the present time. It should be understood that this basic architecture can be and is currently implemented at many levels, as alluded to above, from national or continental power grids to a residential household or even respective portions thereof and thus may vary greatly in design particulars, as will be recognized by those skilled in the art. Thus, input power could correspond to a generator at a commercial power plant or the output of a meter hub at a building or dwelling. AC conversion 14 may be sequentially provided at a variety of locations depending on applications and most particularly in consideration of the distance over which power is to be carried by cable 16. Similarly AC/AC conversion 18 may be provided sequentially several times to isolate or step the voltage down to some standard level such as 110 or 220 volts suitable for use by a device 15 which requires power for operation.

Device 15, depicted in a generalized fashion, is depicted as including an electromagnetic emissions compatibility (EMC) filter and power factor correction (PFC) circuitry 15a to prevent noise due to fluctuations in the load current or the power conversion arrangement from being reflected back into the power distribution system. Further AC voltage conversion may also be provided therein as may be required by the design of one or more voltage converters 15b. Voltage converters 15b convert and condition the power provided thereto to meet the power specifications for load 15c. As alluded to above, load 15c may require power at different voltages, currents and/or waveforms or direct current (DC) which may or may not be regulated or have different regulation tolerances. It is assumed for purposes of the following discussion, particularly in regard to FIG. 2A, that the load 15c will require at least one DC power input which is regulated to some particular specification.

The power distribution system architecture of FIG. 1A has been generally effective for efficient distribution of power in most applications in the past. However, as alluded to above, for some applications that are currently being encountered with increasing frequency, the architecture of FIG. 1A has two principal drawbacks.

First, since cable(s) 16 may be of substantial length, it is desirable to use as small a wire size/gauge as possible to limit the size, weight and cost of the cable 16. Accordingly, a significant but tolerable level of electrical resistance and power loss is thus necessarily designed into the system in accordance with average expected loads. Therefore the capacity to accommodate peak loads is also necessarily compromised and provision for providing higher power levels requires both additional input power capacity and some additional switching or the like to deliver additional power or, alternatively, sequentially switching between load devices 15 to reduce the peak load.

Second, unless the architecture of FIG. 1A is replicated, power can only be delivered in a single form such as alternating current at a particular voltage and frequency. While such a constraint is generally considered to be justified by several factors including cost of cable 16 and generality of accommodating many different types of loads with potentially very diverse power requirements, the EMC filtering and power factor correction 15a and voltage conversion 15b must be replicated many times with attendant costs and size and weight penalties. For example, several different voltage conversion elements/regulators may be required for a single semiconductor logic chip or circuit card in a computer comprising many such chips or circuit cards. Moreover, different AC/AC conversion is often required, possibly with separate EMC filtering and power factor correction, for respective voltage converters 15b which operate at different input voltages in order to achieve acceptable levels of efficiency. Since such AC/AC conversion is most economically and efficiently performed using a transformer, it can be readily appreciated that substantial size and weight may be involved in many applications as well as cost if multiple transformers are required, especially for a single ultimate load. In particular, it has been found that where loads 15c do not contain dedicated voltage converters 15b and may be changed and replacement loads may require different voltages, more voltage converters 15b and AC/AC converters/transformers may be required than are used by any particular load 15c; provision of which may be severely constrained or precluded by the size and/or weight thereof and/or the cabling therebetween and to the load. Voltage regulation specifications of load 15c may also impose restrictions on length of connections which may be physically impossible to meet when unused voltage converters 15b are provided.

Figure 1B:
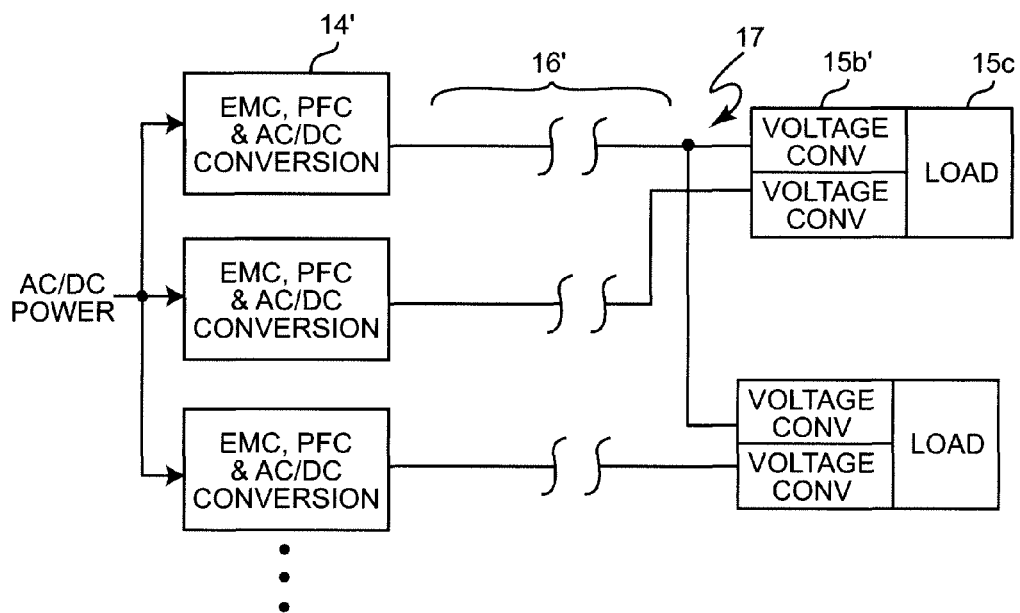
FIG. 1B is a high-level block diagram of a power distribution system that has been proposed.

In an effort to avoid some of these drawbacks for particular applications, the power distribution architecture of FIG. 1B has been proposed which is not admitted to be prior art in regard to the present invention.

It should be noted that much the same elements are present as are present in FIG. 1A; the principal difference therefrom being that EMC filtering and power factor correction and AC/DC (generally unregulated) conversion is provided prior to cable(s) 16, 16', plural cables 161 corresponding to different DC or AC voltages are provided, and voltage conversion 15b' will usually be used to create local load voltage from the voltages on cables 16' and is often limited to DC/DC conversion, generally in the form of a regulator. Each such regulator may be selectively connected to selected and appropriate voltages as depicted at 17. This architecture provides a degree of size/weight reduction and has the capacity in some implementations of providing a high degree of redundancy since more than one AC/DC converter 14' can be provided for each bus/cable 16'. However, local DC/DC or possibly AC/AC conversion is required locally to the load and, if voltage conversion 15b' is not provided with the load 15c and potentially unused voltage converters 15b' are required, no advantage in space, weight or the physical layout or accommodation of the electrical connections thereto is provided proximate to the load by the architecture of FIG. 1B.

Figure 2A:
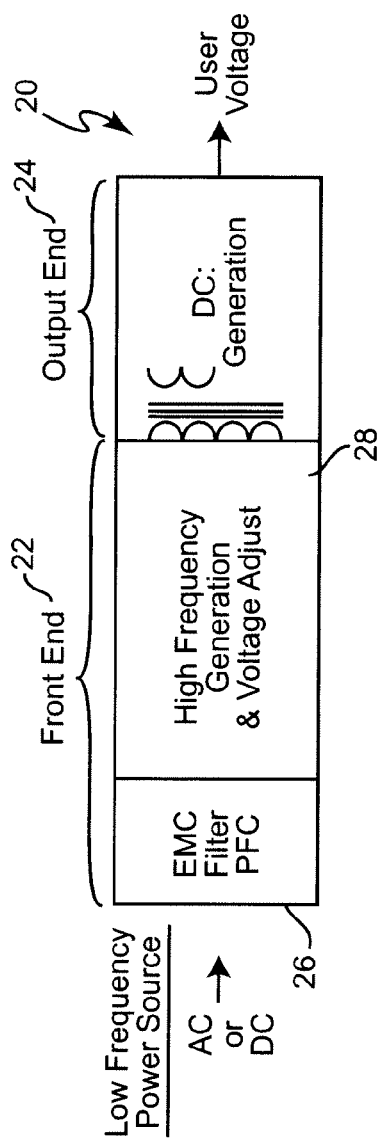
FIG. 2A is a high-level block diagram of a conventional switching regulator type of voltage converter such as may be included in FIG. 1A.

Referring now to FIG. 2A the basic architecture of a voltage converter 20 of the switching regulator type is shown and an understanding thereof will be helpful in conveying an understanding of the basic principles of the present invention. Switching regulators have been developed in recent years to provide an increase in efficiency over so-called linear regulators which exhibit substantial power consumption due to the necessity of developing a (controllable) voltage drop at high current. In contrast, a switching regulator essentially operates by periodically connecting input power (usually unregulated DC voltage) to a circuit which is, in essence, a filter to remove fluctuations in voltage due to the periodic connections to and disconnections from the power source. (In general, it is the noise incident to this switching which is attenuated by the EMC filtering alluded to above.) The frequency and/or duty cycle of the connection of input power is controlled by a circuit responsive to the output voltage in order to achieve voltage regulation.

It should be appreciated that the front end 22 and output end 24 are so designated for purposes of this discussion and to facilitate an understanding of the invention. At the current state of the art and depending on the application, high frequency generation and switching for voltage adjustment and DC generation/regulation and, possibly (e.g. except in the case of a power distribution architecture such as that of FIG. 1B) the EMC filtering and power factor correction (PFC) are generally provided together proximate to the load. The high frequency generation is provided solely for purposes of the switching regulator and is not "seen" by either the load or the input. Within limits, the high frequency chosen for switching of the switching regulator is chosen as an incident of the regulation specifications and constraints of the power converter/regulator/filter, often in regard to size and weight of components thereof. That is, higher switching frequencies usually reduce output ripple and regulation tolerance but may cause limitations on efficiency or be limited by parasitic capacitances of inductors used for regulation but are otherwise unimportant outside the switching power supply, itself.

Moreover, since the high frequency switching waveform is used to regulate the ultimate output voltage via frequency (for a given pulse width) or duty cycle at a fixed frequency or some combination thereof, it has been highly convenient and a conventional practice for the high frequency generation and switching to be located proximate to the DC generation 24 and included in the feedback loop of the overall switching voltage regulator. Additionally, a principal source of losses in switching regulators is related to switching (e.g. parasitic diode losses in the switching transistors). Thus, it has been conventional to provide such high frequency switching at the terminal points of the power distribution system where loads are most fully subdivided and thus lowest. Moreover, for much the same reasons, placing the high frequency switching proximate to the ultimate regulation filtering largely avoids a need to compensate the switching frequency and/or duty cycle for any voltage drops or fluctuation in the high frequency voltage due to the load if the connection is of significant length or if other DC generators are connected to the same high frequency voltage. Additionally, should it be required to develop AC power waveforms at a plurality of non-standard voltages and/or frequencies from power distributed as DC, there is no convenient way of synchronizing them; possibly leading to anomalous effects such as periodic high voltages between circuits or anomalous noise effects.

Figure 2B:
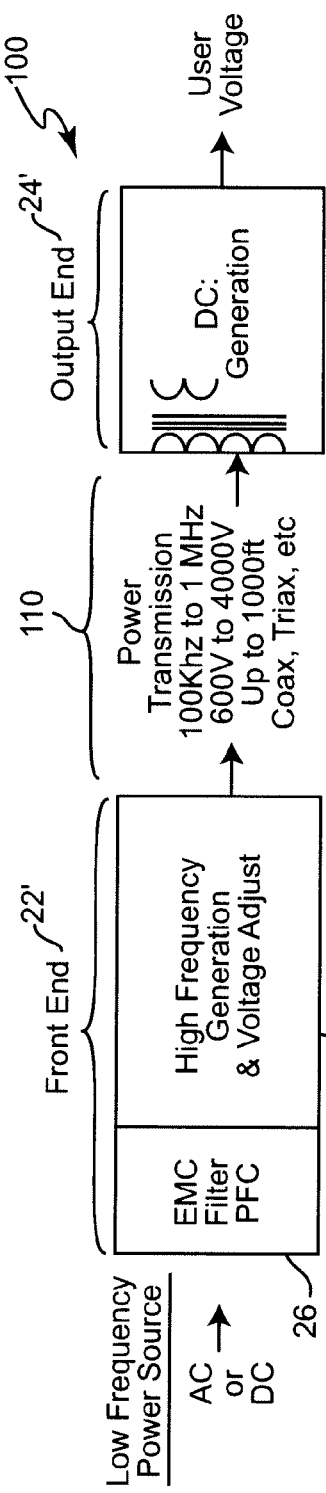
FIG. 2B is a high level block diagram illustrating a basic principle of the present invention.

Referring now to FIG. 2B, the most basic principles of the invention will now be explained. The inventors have discovered that, contrary to the common practice, it is not only feasible but highly advantageous in a very wide variety of applications to spatially and functionally separate the high frequency generation and voltage adjustment of front end 22, 28' of a switching voltage regulator from the ultimate DC (or AC power waveform) generation of output end 24' of a switching voltage regulator, even though feedback to control switching for output regulation would be precluded or made impractically difficult and to transmit power therebetween at high frequency as well as high voltage, as schematically illustrated at a high level of abstraction in FIG. 2B, which, as the inventors have also discovered, has recently become practical due to some recent but largely unrelated developments in power switching.

One of these developments is high current semiconductor switches which are operable at high voltages and are capable of interrupting large currents at high frequency, sometimes referred to as metal oxide semiconductor field effect transistors (MOSFETs), insulated gate field effect transistors (IGFETs) and insulated gate bipolar transistors (IGBTs). While these devices were principally developed for providing direct control of load currents or devices requiring high voltages at high currents, they are capable of providing turn off of high currents (turn off being more difficult and critical than turn on due to circuit inductance) in other applications and thus can provide switching of much higher currents than would normally be encountered in the high frequency generation portion of a switched power supply at a terminus of a power distribution system. Thus such switches can be used in common for a large portion or even the entirety of the power distribution system such that a plurality of DC (and/or AC waveform) generation elements can be driven thereby.

The second recent development exploited by the invention is the development of high efficiency switching regulators including recently developed high voltage (but not necessarily equally high current as the transistors discussed above) transistors which can substantially maintain the efficiency of a switching regulator design (or, for example, a digital waveform synthesizing circuit which can be controlled via network signals such as Ethernet™ communications to control, for example, a programmable logic circuit 37) even when reducing voltage by many hundreds of volts.

The invention also exploits the well-known characteristic of transformers that the design of the core and windings can be reduced in size as the frequency of AC currents applied thereto is increased. For comparison, transformers exist today that can transfer 260 W of power at 1.0 MHZ and can be only about 2.5% of the volume or weight of a transformer designed to transfer the same power of 260 W at 60 Hz. Transformer power capability is linked to the frequency of operation for a given core. Power density of a transformer core can be seen to increase for a given core size (e.g. cross-sectional area of the core) by increasing the frequency, f, while maintaining the same intended voltage, E, and flux density, B, by the following transformer equation:

$$E = K \times B \times N \times f \times A$$

where K is a constant (generally taken as approximately 4), N is the number of winding turns and A is the area of the core. From this relationship, increasing the frequency by a factor of two would allow the core area to be decreased by one-half (decreasing size and weight) while maintaining the other parameters and power transfer capability unchanged. Conversely, particularly for high power applications, transformers have been designed to have a simple and highly robust core and physical support structures implying use at low frequency current in the established 50/60 Hz local power conversion and transmission methods. High frequency current has generally been avoided in power circuits due to efficient power generation circuit technology such as the MOSFET and IGBT devices, increased circuitry over basic transformers, cross over from power transmission to electronics design, thermal considerations and structural complexity without producing significant advantages while presenting some limitations in transmission of power for relatively long distances. For example, use of a single ferrite core for a transformer may cause significant design development to address effects such as leakage inductance and parasitic capacitance that may be relatively more pronounced and/or difficult to control, particularly at high frequencies. However, for many applications such as electrical isolation and voltage adjustment in both signal and lower power circuits, small transformers have been developed and used, including use of ferrite cores in switching regulators such as that discussed above in connection with FIG. 2A. Most local power distribution systems such as in houses or ships are 115V AC at 20 A which is a few kiloWatts. At less than ten kiloWatts, basic commercial off-the-shelf high frequency type transformer cores are now readily available and, in turn, usable to allow high frequency power distribution in industrial or commercial applications.

Thus, as shown in FIG. 2B the most basic implementation 100 of the invention is to separate the high frequency and voltage adjustment front end 22, including EMC filtering and PFC circuits 26 of a switching regulator from the output end 24 and to make the high switching frequency independent of the output voltage such that a plurality of output ends 24 can be supplied from a single front end 22. High frequency is defined as a range of frequencies limited at the low frequency end by the ability to minimize (or sufficiently reduce for a given application) transformer size yet stay within the practical limits of switching circuitry and not increasing the frequency to the point where electromagnetic transmission effects such as line reflections and reactive effects cause unacceptable inefficiency of power transfer. The low frequency end of the high frequency range where significant advantages may be achieved through use of the invention is considered, by the inventors, to be about 800 Hz where power transmission transformers can double the power transmitted at 60 Hz for a given core size; thus making the invention cost-effective. However, since the size and weight of transformer cores required to supply power to a given load may be correspondingly decreased to reduce weight and simplify layout of components and enable more closely located loads to be supplied than has been possible prior to the invention, the preferred lower frequency for practice of the invention is substantially higher than 800 Hz to allow substantial power to be transferred by commercially available small ferrite cores with a relatively few primary and secondary winding turns. For example, a frequency of 30 KHz allows a transformer core weight reduction to a few percent (e.g. less than 5% and often less than 3%) and an associated volume reduction (which is sufficient to alleviate virtually all component layout design constraints alluded to above in supplying power to closely spaced loads or power converters) relative to a transformer operating at 60 Hz to transfer the same amount of power. Somewhat higher frequencies can reduce the transformer core weight and size to less than 1% of a transformer operating at 60 Hz for transfer of the same power. For comparison, a commercially available 2 KVA load transformer operating at 60 Hz weighs 50 pounds and has a volume of 600 cubic inches but could be replaced by a 0.5 pound, 7 cubic inch load transformer operating at 30 KHz (e.g. less than 5 cubic inches and one-half pound per KVA which is considered sufficient to meet all but the most demanding of weight and physical layout design constraints).

As a practical matter, the high frequency is generally limited at the high frequency end by the propagation wavelength in the power connection 110 such that the length of the power distribution system between the high frequency switching 28' and the input to the output end 22' does not exceed one-tenth of the propagation wavelength. For comparison, a power transmission line at 60 Hz has a ¹⁄₁₀ wavelength of five hundred kilometers but at 150 KHz, the ¹⁄₁₀ wavelength is only two kilometers which is impractically short for long distance power transmission but more than adequate for many local power transmission applications. At the preferred low end frequency of 30 KHz which is considered practical to utilize commercial off-the-shelf (COTS) components while minimizing size, one-tenth the wavelength is approximately one thousand feet which is longer than required for most local single power distribution systems. At a nominal frequency of 100 KHz, the one-tenth wavelength is approximately 300 meters which is a reasonable maximum distance for a single power distribution system while still allowing use of common ferrite cores and power circuit designs and components as well as commercially available higher performance components. At a frequency of 1 MHZ, the one-tenth wavelength is only 30 meters is impractically short for long distance power transmission and extremely limiting for most local power transmission applications but may yet remain suitable for applications such as in aircraft and therefore 1 MHz approximates the highest practical limit for practice of the invention.

Thus the most preferred frequency range for practice of the invention is approximately 30 KHz to 1 MHZ which extends from a point at which geometrical constraints on component location are sufficiently ameliorated to allow current and foreseeable power distribution requirements to be met while greatly reducing weight to a frequency near the cusp of significant transmission line effects which may be technically impractical to overcome or posing significant product cost risk. The frequency or frequencies chosen may be fixed, variable or even various combinations of frequencies and may be controlled by discrete or communication connections such as Ethernet local area network from a power generation control room on a ship or controller on a series of duplicate devices. A preferred maximum length of the power distribution system of one thousand feet is sufficient for most large ships and most large buildings and even entire neighborhoods or municipalities having a geographical extent of roughly ⅖ mile diameter. Thus, the preferred frequency range where the advantages of the invention are very pronounced is sufficient for a very wide variety of applications. (The preferred distance limit may be freely adjusted by choice of high frequency but it should be appreciated that the preferred distance limit is not of any practical significance since the power distribution architecture in accordance with the invention may be replicated at spaced intervals with power input thereto in a conventional manner, for example, to cover any desired area.)

Preferred connection wiring structures (e.g. coaxial cable, triax, twisted pairs and the like being examples of preferred common wiring types while other wiring types and/or protection arrangements or coverings may be freely applied) much greater than the wiring types and structures available for low frequency, high current busses 16 can also be used. The wider variety of cabling possible in implementations of the invention is also enhanced by the preferably high voltage (which, as used herein, refers to a voltage higher than the source voltage) preferably used, preferably in the range of 600V to 4000V; allowing a smaller gauge/cross-sectional area wire to be used with less loss to carry the required peak currents, as is well-recognized in the art but generally in the context of much longer distances at much lower 50/60 Hz frequencies. Conversely, for a given length of the same wire gauge and power losses, far more power can be delivered at a higher voltage in accordance with the familiar $V^2/R$ relationship.

For example, for 336 W loss in a 200 foot length of 12 AWG wire, only 2,200 Watts could be delivered at 115V whereas 46,000 Watts could be delivered at 2000V on 12 AWG coaxial cable. In terms of delivered power-to-weight efficiency, the 115V case would require 4.3 pounds of wire per KW delivered over 200 feet while in the 2000V case, the weight/KW would be reduced to a mere 0.2 pounds; more than a twenty-fold weight or volume reduction. Cable selection would take into account the capability of the specific cables to reduce emissions due to higher transmission frequencies. However, this consideration is basic to conventional RF cabling design which is well established and understood in the art.

Figure 3:
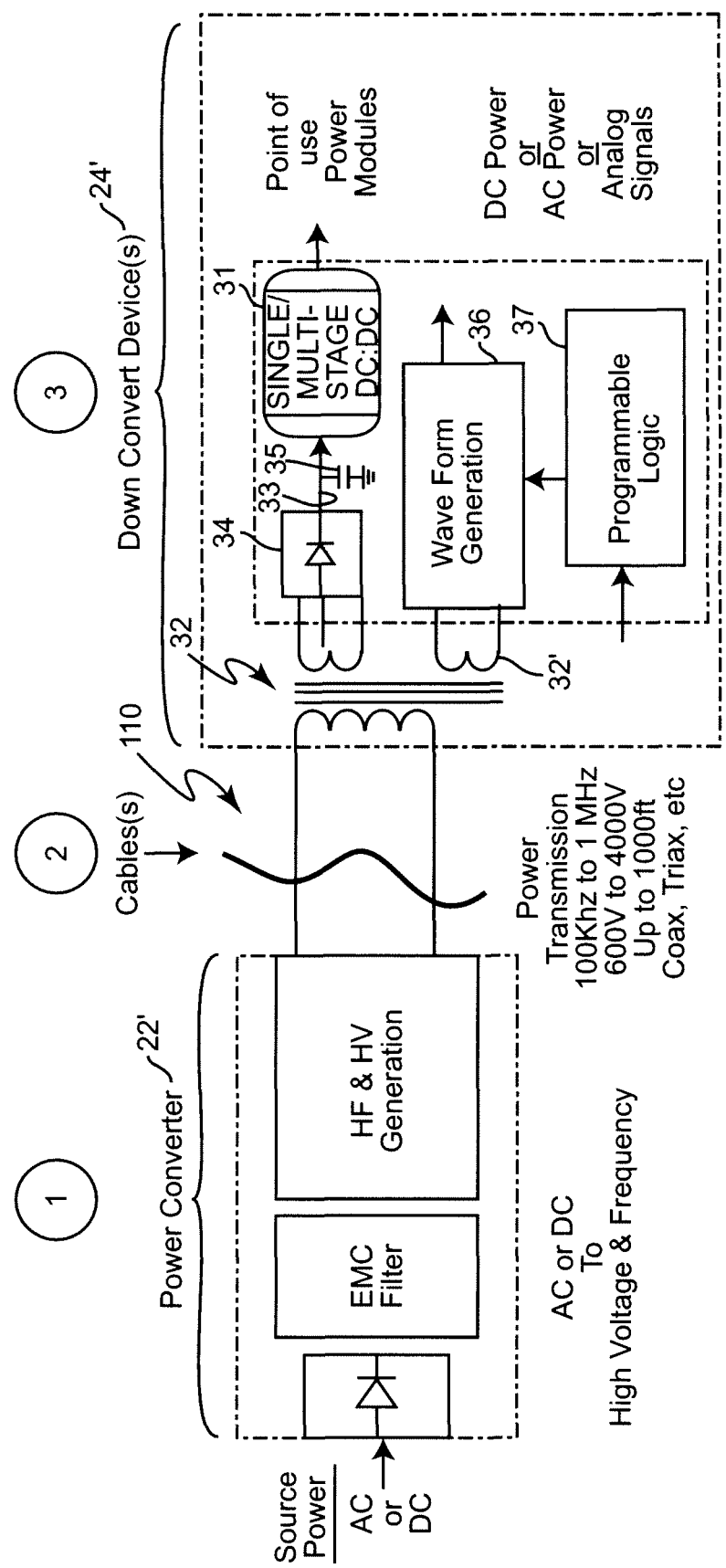
FIG. 3 is a more detailed block diagram generally corresponding to FIG. 2B illustrating a preferred embodiment and implementation of the present invention.

Referring now to FIG. 3, a preferred embodiment of the invention and the wide scope of advantages thereof will now be discussed. For reference, it should be appreciated that in the architecture of the power distribution arrangement of FIG. 1B, each of the AC/DC converters 14' will generally provide a DC voltage of 3.3V-48V and an AC voltage of 110V/220V or 440V at 50-60 Hz or 400 Hz and wiring 16' will thus comprise at least one AC bus and at least one DC bus but usually many more. A principal advantage of distribution of power at both high voltage and high frequency is that only one power bus is required and the AC or DC voltages may be derived locally to the load with very small, light weight and inexpensive commercial-off-the-shelf (COTS) devices instead of complete low frequency power supplies since no constraints are imposed thereon by the architecture of the invention.

For example, the inventors are implementing switching regulators 31 using duty-cycle modulation or other frequency-independent switching which can operate directly from the high frequency distribution waveforms with or without AC voltage step down using transformer 32 (which also provides isolation of the down convert devices 24') to achieve 1% regulation at DC voltages between 28V and 33V which is a standard output voltage for some ships and aircraft equipment and regulation between 1% and 3% is generally sufficient for most DC loads while other DC voltages such as 3.3V, 5V and 12V or voltages above 33V with much stricter local regulation, if needed, can be readily derived therefrom with a single additional COTS high frequency switching regulator stage (also depicted at 31).

Unregulated DC with very low ripple voltage (also approaching 1% tolerance) may also be derived at node 33 by use of a rectifier circuit 34 (e.g. half-wave, full-wave, bridge or the like) and filter capacitor 35. In this regard, high frequency such as that in the preferred range for practice of the invention, is effective to reduce the ripple voltage magnitude to a very low level while allowing the filter capacitance value and the size of the capacitor required to provide it to be reduced to a very small value, size and weight. For example, to achieve a 1% ripple voltage at 28V (unregulated) supplying 330 W, a capacitance of approximately 500,000 µf would be required by a full-wave rectified 60 Hz input whereas for the same load and an input at 600 KHz, only about 50 µf filter capacitance would be required thus supporting a very substantial reduction in size, weight and cost, particularly since capacitor structures (e.g. ceramic, film, tantalum) which are not suitable for large capacitances but are more efficient in terms of size and weight may be used. Likewise, the least expensive electrolytic capacitors are beneficial in reducing size.

In addition, the power distribution architecture in accordance with the invention can allow any AC voltage that may be required to be derived locally in a simple manner and can be synchronized throughout the power distribution system. For example, a low voltage, high frequency sine wave (synchronized throughout the power distribution system in accordance with the invention can be derived at any voltage directly from a winding 32' of transformer 32 which may be formed on the same small (e.g. ferrite) core as any windings used to derive regulated or unregulated DC voltages and which may be very small and light in weight due to the high frequency AC input. In fact, as many windings as are physically possible for producing AC or DC voltages may be formed on the same core with virtually no size or weight penalty. Any frequency and any waveform, synchronized as desired, can also be produced by, for example a waveform generator 36 (e.g. digital) under control of programmable logic 37.

Due to the need to meet typical conducted electromagnetic emissions requirements, most switching supplies require filtering to remove harmonics created by the switching process. This energy is typically minimized by the design of the regulator but additional switching is almost always required to meet performance regulations. The regulations are to protect other users of the low frequency input source power. Since the architecture of the present invention is a local area distribution with only a single input power location, most of the required filtering can be transferred from each of the output end regulators to the front end of the entire system. Typical top brand name COTS "Brick" type DC:DC and AC:DC regulators require a filter network which is 50% to 100% of the size of the regulator. The transfer of location made possible in accordance with the invention reduces the volume required locally at the output end. All of the above discussed variations of the down convert device (which should be understood as a generalization of output end or DC generator 24') may be provided in a modular form which may be interchangeable in its entirety or with interchangeable components such as switching regulators 31 to provide particular voltages needed by particular loads and which may be replicated as needed to provide additional particular voltages or to service additional loads generally through use of COTS components. If a suitable COTS component is not available to meet particular power requirements of a load such as particularly stringent regulation or ripple, a suitable down conversion device can be easily designed at small size and weight with minimal trade-offs in regard thereto. For example, in the above discussion of ripple, a larger filter capacitance can be provided to reduce ripple to a small fraction of 1% with virtually no size or weight penalty for many capacitor technologies. The same types of changes can be applied to switching regulators. More generally, such more stringent power specifications or additional voltages can be met by an additional switching regulator stage of small size and weight but may be met, in many cases, by a filter that can be provided at even lower size and weight.

Some important advantages of the power distribution architecture in accordance with the invention can also be achieved at the power converter or front end 22. Assuming that suitable input power is available and that the ultimate load(s) are intermittent, (e.g. as might be implemented by providing a power distribution system in accordance with the invention for the steady-state loads and replicating it to provide another system for intermittent loads as might be required for particular shipboard operations or in a hospital or laboratory having equipment such as tomography equipment presenting intermittent loads, an entire distribution system may be shut down (as distinguished from being placed in a stand-by or sleep state that consumes power) when not needed and reactivated within a very few milliseconds comparable to the time required to power-up a circuit to control the high frequency power switching transistors alluded to above, when the intermittent load is to be operated. Thus, the distribution system can be "run" at zero power when not needed and can deliver needed power almost instantaneously when such power is required. In addition, the front end could vary the frequency of transmission for multiple reason such as to deliver power to specific loads which have band pass filtering or emission control. In such a case, the front end would include any necessary filtering to meet conducted emission regulations.

Additionally, the overall power distribution system architecture in accordance with the invention provides for reduction of the total number of complete power conversion stages required, reduced volume at the output end and the associated number of sources of inefficiency. Since voltage conversion from the high frequency AC power transmission voltage and current may be optionally performed or freely designed as may optimize efficiency of any given power conversion stage, it follows that an overall efficiency of the present invention which is equal to or greater than that of known systems and over and above the efficiency derived from being able to "run" the system at zero power when no output power is required and the increases in efficiency derived from reduced wiring losses as well as the economic efficiencies to be derived from reduced hardware requirements as discussed above can be readily achieved. The efficiency of this architecture is further enhanced when used on platforms such as aircraft, ships and vehicles which need to generate power from a fuel source that has high procurement costs, less efficient electrical generation methods and additional costs to transport the same fuel. As an example, some vehicles use gas turbines to generate electricity at less than 60% system energy transfer while also paying high marine fueling costs. Similarly, cost per pound on an aircraft over its life is extremely high. For example, aircraft can typically exhibit a fuel savings of one thousand dollars per pound removed. Thus reduction of any amount of weight is critical.

As an example of weight reduction provided by the invention, a 440V 60 Hz or 700V DC source input converted to 1200 VAC at 130 KHz high frequency transmission voltage, down converted by a transformer and a single switching digital regulator driven by the 130 KHz feed to 28-33 VDC and a secondary filtering stage for local logic power may be a common application of a distribution branch in accordance with the invention. Such a resulting implementation would replace approximately 190 pounds of discrete single stage regulators into less than 60 pounds of high frequency output end regulators.

The resulting characteristics of the invention thus include allowing other equipment to be located where, historically, it was not feasible to do so and thus significantly reducing large support cabling and easing maintenance access. For new or foreseeable equipment needing special regulation or ripple requirements, simple trade-offs between cost and volume may be employed while many other design complications of a given implementation of a power distribution system may be avoided.

Figure 4:
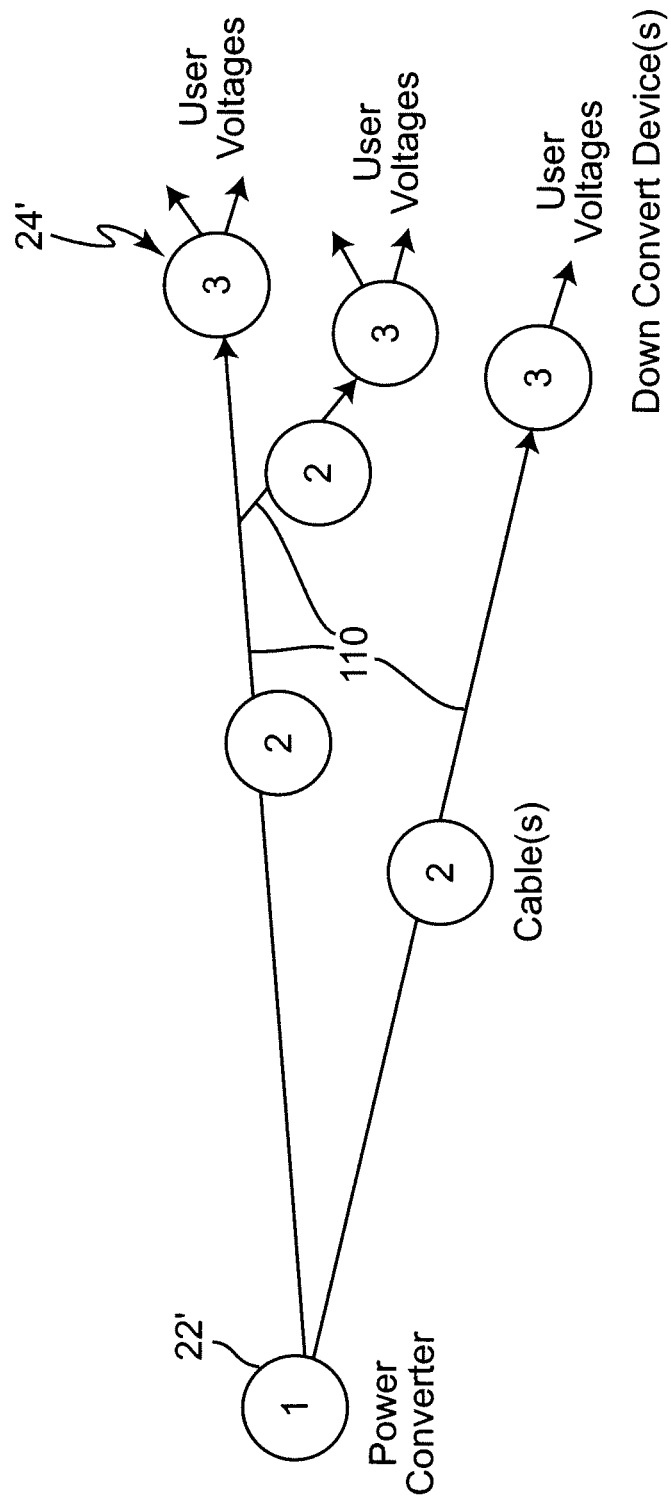
FIG. 4 is an exemplary architecture of a power distribution system including the present invention.

Referring now to FIG. 4, a high level schematic diagram of an exemplary application of the invention is shown. The overall distribution pattern is tree-like and may branch as required by the particular application of the invention. It is important to note that only a single front end 22' is required, saving space and weight and avoiding duplication of high frequency switching which is provided at the termini or "leaf nodes" of conventional power distribution systems. Interconnection cables 110 may also be of reduced size, weight and cost and more types of connection wiring can be used. Output end hardware may also, in most applications, be reduced in size cost and weight and may be more readily modified or adapted to loads as may be required by changes in equipment to be powered from the system. Thus it is seen that the architecture in accordance with the invention provides significant advantages in all portions of that architecture as compared with known power distribution systems.

Figure 5:
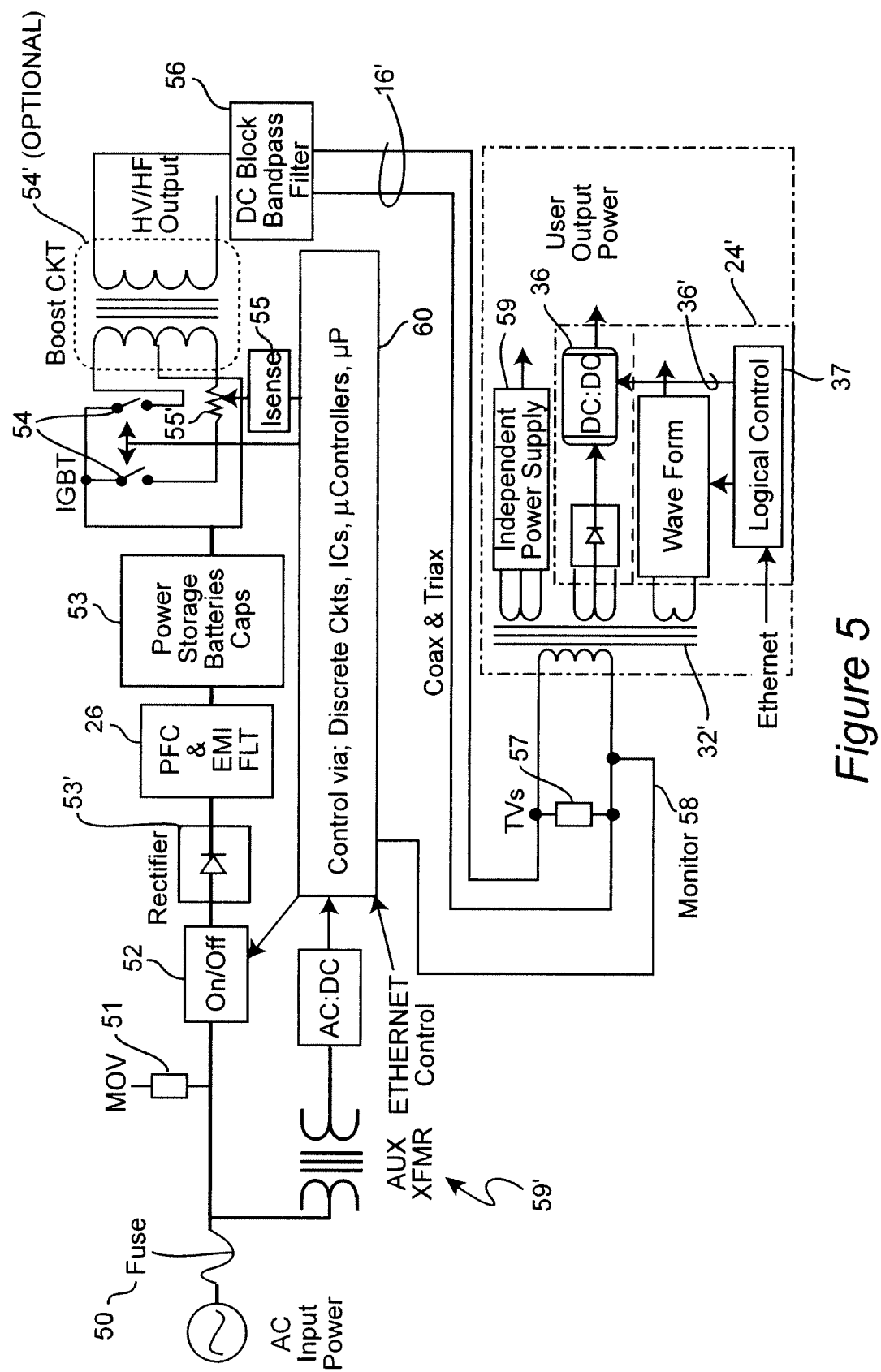
FIG. 5 illustrates addition of various perfecting features to the basic architecture of the invention.

The architecture of the power distribution system in accordance with features that are generally found to be desirable in known power distribution architectures and, while not all are necessary or even desirable in all potential applications of the invention, any or all can be included as may be deemed advantageous for a particular application of the invention as will now be discussed in connection with FIG. 5, and may be considered as perfecting features thereof which are not necessary to the practice of the invention in accordance with its basic principles but providing improved functionality thereof in some applications. Other applications of various additional features will be evident to those skilled in the art from the following discussion.

For example, it is generally desirable to provide a series fuse or ground fault circuit interrupter (GFCI) 50 in each replication of the architecture in accordance with the invention to protect the power distribution network and individual components therein from over-current conditions. In this regard, either series or parallel connections of metal oxide varistors (MOV) 51 may be desirable for protection from voltage transient spikes and other over-voltage conditions. An on/off switch 52 or equipment safety interlocks, or the like may also be desirable, particularly where a power distribution tree is dedicated to a particular system or apparatus that may be only intermittently used or as a safeguard against unintended operation of such system or apparatus. Such switching assures that a distribution tree in accordance with the invention can be shut down to have zero power consumption when systems and apparatus powered thereby are not desired to be in use and may be automatically or remotely controlled by controller 60 that may include various types of circuits ranging from discrete circuits to logic ICs, micro-controllers and micro-processors receiving an input from a control signal network. An uninterruptible power supply (UPS) 53 can also be provided following power factor correction and power line filtering circuits 26 for electromagnetic compatibility (EMC) compliance. Such provision is generally provided by using back-up batteries or power storage capacitors and thus must be operated at a DC voltage requiring a rectification arrangement (e.g. diode, full wave, bridge or the like) 53'. Of course, DC operation is generally desirable because of high frequency generation in accordance with the invention and rectification arrangement 53' should usually be included even when UPS 53 is not provided.

In view of the currents involved, it may be desirable to use a center tapped primary winding transformer for voltage boost circuit 54' and to drive it to develop a high frequency via IGBT, MOSFET or IGFET switches in a push-pull configuration as shown at 54. If suitable input voltage is available to limit currents, it may be desirable to use a center tapped primary winding transformer for voltage boost circuit 54' but to drive the power transmission bus directly to develop high frequency via IGBT, MOSFET or IGFET switches in, for example, a H-bridge configuration. Current sensing may be performed and additional dynamic protection or balancing of the push-pull circuit or other control or protection of downstream circuits may be provided as schematically illustrated at 55, 55'. Note that the high voltage distribution circuit 16' between the voltage boost transformer 54' secondary and the primary winding of the voltage step-down transformer 26' (if used) is floating and DC blocking circuitry and/or bandpass filter circuitry may be desirable to avoid over-voltage and/or remove (collectively indicated at 56) inductively coupled harmonic and load-induced transients at the output of the voltage boost circuit. They could also be used to selectively allow power to pass to specific loads if the power generation device creates the appropriate frequency (above or below the high frequency as defined above) that will pass through the filter. Similarly transient voltage suppression 57 may be provided at the input of the step-down output stage 24'. The current and voltage magnitude and quality can also be monitored as schematically illustrated at 58 and fed back to control arrangement 60 which may alter switching frequency or duty cycle or the like to compensate for or correct the high-frequency high-voltage power delivered. The DC:DC converter 36 may also be made responsive to programmable logic 37 as shown at 36' and the programmable logic can be remotely controlled as discussed above. Additionally, independent power supplies (e.g. unregulated, linear or switched) which are compatible with the high frequency input can also be used directly to provide source power to loads as depicted at 59.

In view of the foregoing, it is seen that the power distribution architecture in accordance with the invention provides a highly flexible platform for distributing power to a wide variety of loads potentially having a wide variety of power requirements and which avoids limitations on meeting peak load requirements while providing numerous operational and cost efficiencies while allowing stringent design constraints imposed by particular applications to be readily met. The architecture in accordance with the invention is particularly applicable to many types of vehicles now foreseen and many large buildings and may be extended by replication to cover even larger applications. Implementation of a power distribution system in accordance with the invention also allows for great flexibility in design and variations of the above-described preferred embodiment can be made. For example, transformers of small size and preferably based on Ferrite cores can be placed at the output of the front end or input to the output end (for isolation and one voltage adjustment) or both (as would be typical for voltage boost as described above in regard to boost transformer 54' or omitted entirely and/or replaced by switching where isolation is not required While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A power distribution system architecture including
    a single front end, said front end receiving power at an input voltage, said front end including means for generating an alternating current at a selectable voltage above said input voltage at a selectively controllable high frequency for distribution over said power distribution system architecture, said high frequency being a frequency equal to or above that which allows transfer of power by a transformer having a volume or weight of less than 5% of a transformer capable of transferring the same amount of power at 60 Hz and below a frequency that which will reduce one-tenth of a propagation wavelength of said controllable high frequency in connection wiring below one thousand feet, and
    an output end including means for producing a desired output voltage or waveform from said voltage above said input voltage at said selectively controllable high frequency, said output end being spatially separated from said front end and connected to said front end by connection wiring.

2. The power distribution architecture as recited in claim 1, wherein said output end further includes
    a switching regulator.

3. The power distribution architecture as recited in claim 1, wherein said means for producing a desired voltage or waveform includes means for producing a desired DC voltage and said output end further includes a waveform generator.

4. The power distribution architecture as recited in claim 3, wherein said waveform generator is controlled by programmable logic.

5. The power distribution architecture as recited in claim 3, wherein said means for producing a desired DC voltage is controlled by programmable logic.

6. The power distribution architecture as recited in claim 1, wherein said connection wiring is driven by a transformer at an output of said single front end.

7. The power distribution architecture as recited in claim 6, wherein said transformer at an output of said single front end is a center-tapped primary winding transformer.

8. The power distribution architecture as recited in claim 6, wherein said transformer comprises a boost circuit.

9. The power distribution architecture as recited in claim 1, wherein said connection wiring is driven directly by switches.

10. The power distribution architecture as recited in claim 1, wherein said output end receives power from said connection wiring through a transformer.

11. The power distribution architecture as recited in claim 1, further including one of a fuse, a ground fault circuit interrupter and a varistor for controlling input of power to said single front end.

12. The power distribution architecture as recited in claim 1, further including an on/off switch to control input of power to said single front end.

13. The power distribution architecture as recited in claim 12, wherein said on/off switch is controlled via discrete circuits, integrated circuits or a microprocessor responsive to network signals.

14. The power distribution architecture as recited in claim 1, further including an uninterruptible power supply to said single front end.

15. The power distribution architecture as recited in claim 1, wherein said single front end further includes one of power factor correction and electromagnetic interference filtering circuits.

16. The power distribution architecture as recited in claim 1 further including DC block bandpass filtering.

17. The power distribution architecture as recited in claim 16, wherein said DC block bandpass filtering is provided in said connection wiring.

18. The power distribution architecture as recited in claim 1, further including output monitoring of said connection wiring and feedback to control said means for generating a voltage above said input voltage.

19. The power distribution architecture as recited in claim 1, further including transient voltage suppression at an input to said output end.

20. The power distribution architecture as recited in claim 1, wherein said output end further includes an independent power supply which is compatible with power input at said high frequency.

21. The power distribution architecture as recited in claim 1, further including means for controlling power distribution among branches of a power distribution network in which power is transferred at a frequency above or below a frequency at which power can be transferred by a ferrite core, means for varying said frequency, and means for filtering said frequency in connection wiring of said power distribution network.

22. The power distribution architecture as recited in claim 1 wherein said high frequency is equal to or above that which allows transfer of power by a transformer of less than 5 cubic inches or one-half pound per KVA of transmitted power.

23. A method of controlling power distribution among branches of a power distribution network in which power is transferred through connection wiring at a selectively controllable high frequency above a frequency at which power can be transferred by a transformer having a volume or weight of 5% or less compared to a transformer capable of transferring the same amount of power at 60 Hz and below a frequency which will reduce one-tenth of a propagation wavelength of voltage in said connection wiring below one thousand feet, said method including steps of varying said selectively controllable high frequency, and filtering said high frequency in said connection wiring of said power distribution network to control said distribution of power in respective branches of said power distribution network.

* * * * *